Patented Aug. 20, 1935

2,011,952

UNITED STATES PATENT OFFICE 2,011,952

AGE RESISTING VULCANIZED RUBBER

Robert L. Sibley, Nitro, W. Va., assignor to The Rubber Service Laboratories Company, Akron, Ohio, a corporation of Ohio No Drawing. Application September 15, 1930, Serial No. 482,158

9 Claims. (Cl. 18—50)

The present invention relates to an improved process in the vulcanization of rubber, balata and analogous compounds and the products obtained thereby, wherein desirable age resisting properties are developed in the vulcanized rubber product. The invention will be understood from the following description and examples wherein a preferred mode of operating the invention is fully set forth and described.

It is well known that rubber deteriorates rapidly when exposed to air, heat and sunlight and that such deterioration is characterized by a loss in the tensile strength, resiliency and other desirable properties of the vulcanized rubber product. It has now been found according to the present invention that such deterioration can be greatly lessened if there be incorporated in the rubber mix a compound of the class hereinafter set forth.

The age resisting characteristics of a vulcanized rubber product can be readily ascertained by subjecting samples of the vulcanized product to an accelerated aging test wherein portions of the cured rubber product are subjected in a bomb to the action of oxygen under pressure and maintained for several hours at an elevated temperature. The treated samples are then examined and tested and the results compared with results similarly obtained by testing the unaged vulcanized rubber stock. The deterioration in properties suffered as a result of the oxidation treatment is indicative of the result that would normally be expected from that particular stock during several years of natural aging. Such a test is known as the Bierer-Davis aging test.

The new class of anti-oxidant or age resisting materials which after incorporation into a rubber stock have been found to impart such excellent age resisting qualities to the vulcanized product that portions thereof, when subjected to the artificial aging tests described, undergo only a relatively small loss in modulus, tensile strength and other qualities, comprises a reaction product of a hydroxy substituted diphenyl alkylidene compound and an aromatic amine.

One method whereby one of the preferred class of anti-oxidants, for example a reaction product of substantially two molecular proportions of beta naphthyl amine and substantially one molecular proportion of dihydroxy diphenyl methane may be prepared is as follows:

Dihydroxy diphenyl methane was prepared by refluxing a mixture of phenol and formaldehyde in the proportion of substantially two molecular proportions of phenol to substantially one molecular proportion of formaldehyde for substantially from two to four hours in the presence of a catalyst or condensing agent, for example sulfuric acid. After completion of the reaction, the product formed was preferably washed first with a weak alkaline solution, for example a five percent sodium hydroxide solution, and then with water. The alkali and water washed material was then heated preferably to a temperature of substantially 220° C., whereupon the reaction product after cooling solidified to a resin, which ground to a nearly white powder, melting at substantially 60 to 62° C.

Dihydroxy diphenyl methane prepared in the manner hereinbefore set forth and beta naphthyl amine in the ratio of substantially one molecular proportion of the former to substantially a slight excess over two molecular proportions of the latter were heated in the presence of beta naphthyl amine hydrochloride for approximately 4 to 6 hours at a temperature of substantially 190 to 210° C. After the heating was completed, the reaction product was washed thoroughly with boiling water and dried. As a further means of purification, the water-washed product was washed with hot ethyl alcohol. The product thus obtained was a solid melting at substantially 162.0° C. to 166° C. The product prepared in the manner described above was compounded in the well known manner in a typical rubber tread stock comprising

| | |
|---|---|
| 100 | parts of smoked sheet rubber |
| 40 | parts of carbon black |
| 10 | parts of zinc oxide |
| 2 | parts of a blended mineral oil and rosin |
| 3.25 | parts of sulfur |
| 1 | part of diphenyl guanidine |
| 1 | part of the anti-oxidant described |

The compounded stock was then vulcanized by heating test sheets of said stock in a press in the well known manner for different periods of time at the temperature given by forty pounds of steam pressure to the square inch (that is 287° F.). Portions of the stock cured as set forth were then artificially aged by heating portions of the stock in an oxygen bomb in the manner described for 39 hours at a temperature of 70° C. and an oxygen pressure of 300 pounds per square inch. A comparison between the tensile and modulus properties of the aged and unaged vulcanized rubber products is given in Table I.

*Table I*

| Cure | | Hours aged | Modulus of elasticity in lbs./in.² at elongations of— | | Tensile at break in lbs./in.² | Ultimate elongation percent |
|---|---|---|---|---|---|---|
| Time mins. | Lbs. steam pressure | | 300% | 500% | | |
| 30 | 40 | 0 | 781 | 2135 | 3000 | 635 |
| 30 | 40 | 39 | 849 | 1820 | 1870 | 500 |
| 60 | 40 | 0 | 1268 | 3090 | 4165 | 635 |
| 60 | 40 | 39 | 1285 | 2555 | 2605 | 510 |
| 90 | 40 | 0 | 1650 | 3560 | 4520 | 600 |
| 90 | 40 | 39 | 1490 |  | 2575 | 480 |

The data set forth in Table I shows that a vulcanized rubber product wherein there is incorporated prior to the vulcanization thereof one of the preferred class of anti-oxidants, for example a reaction product of dihydroxy diphenyl methane and beta naphthyl amine retains to a marked degree its original unaged characteristics after undergoing the accelerated aging test hereinbefore set forth.

The reaction product of dihydroxy diphenyl methane and alpha naphthyl amine has also been prepared in a manner analogous to the reaction product of dihydroxy diphenyl methane and beta naphthyl amine. The product thus obtained, which was a resin in nature, was incorporated in the usual manner in a rubber tread stock comprising

| 100 | parts of smoked sheet rubber |
| 40 | parts of carbon black |
| 10 | parts of zinc oxide |
| 2 | parts of a blended mineral oil and rosin |
| 3.25 | parts of sulfur |
| 1 | part of diphenyl guanidine |
| 1 | part of anti-oxidant |

The rubber stock thus compounded was vulcanized in the usual manner, and portions of the cured rubber product were artificially aged in the manner hereinbefore set forth in an oxygen bomb at 70° C. and under an oxygen pressure of 300 pounds per square inch. A comparison between the aged and unaged vulcanized rubber product is set forth in Table II.

*Table II*

| Cure | | Hours aged | Modulus of elasticity in lbs./in.² at elongations of— | | Tensile at break in lbs./in.² | Ultimate elongation percent |
|---|---|---|---|---|---|---|
| Time mins. | Lbs. steam pressure | | 300% | 500% | | |
| 30 | 40 | 0 | 796 | 2005 | 2355 | 560 |
| 30 | 40 | 39 | 655 |  | 1005 | 430 |
| 60 | 40 | 0 | 1244 | 3000 | 4050 | 630 |
| 60 | 40 | 39 | 976 |  | 1498 | 450 |
| 90 | 40 | 0 | 1530 | 3220 | 3930 | 580 |
| 90 | 40 | 39 | 1125 |  | 1388 | 380 |

From the data given in Table II it is apparent that the reaction product of dihydroxy diphenyl methane and alpha naphthyl amine possess the antioxidant properties of the preferred class of compounds. A stock similar to that employed in the foregoing test with the sole exception that no anti-oxidant be used when subjected to the aging test described, melts to a shapeless mass incapable of test.

A reaction product of substantially one molecular proportion of dihydroxy diphenyl methane and substantially two molecular proportions of aniline has also been prepared in a manner analogous to that hereinbefore set forth and on testing in a rubber tread stock was found to possess anti-oxidant properties characteristic of the class described herein.

As a further example of the use of the preferred class of compounds, a reaction product of 2,4 tetrahydroxy diphenyl methane and beta naphthyl amine was prepared in the following manner.

2,4 tetrahydroxy diphenyl methane, prepared from resorcinol and formaldehyde in a manner analogous to that set forth in Berichte der Deutschen Chemischen Gesellschaft, vol. 25, page 947, and beta naphthyl amine in the ratio of substantially one molecular proportion of the former to an excess over substantially four molecular proportions of the latter were heated for substantially two to five hours at a temperature of approximately 190 to 200° C. in the presence of beta naphthyl amine hydrochloride. After the heating of the above reactants was completed, the reaction product was digested with a quantity of dilute acid, for example 10 percent dilute hydrochloric acid, and then washed with water. If convenient or desirable, the product thus obtained may be washed with an organic solvent for example ethyl alcohol. The material prepared as described was incorporated in a rubber tread stock comprising

| 100 | parts of smoked sheet rubber |
| 40 | parts of carbon black |
| 10 | parts of zinc oxide |
| 2 | parts of a blended mineral oil and rosin |
| 3.25 | parts of sulfur |
| 1 | part of diphenyl guanidine |
| 1 | part of anti-oxidant |

The rubber stock thus compounded was vulcanized by heating in a press for different times at the temperature given by 40 pounds of steam pressure per square inch. Portions of the cured rubber product were then artificially aged by heating in a bomb for 39 hours at 70° C. under an oxygen pressure of 300 pounds per square inch. The tensile data obtained on testing the aged and unaged vulcanized rubber compound are given in the following table.

*Table III*

| Cure | | Hours aged | Modulus of elasticity in lbs./in.² at elongations of— | | Tensile at break in lbs./in.² | Ultimate elongation percent |
|---|---|---|---|---|---|---|
| Time mins. | Lbs. steam pressure | | 300 Percent | 500 Percent | | |
| 30 | 40 | 0 | 830 | 2095 | 2600 | 640 |
| 30 | 40 | 39 | 775 |  | 1568 | 485 |
| 60 | 40 | 0 | 1395 | 3110 | 3960 | 625 |
| 60 | 40 | 39 | 1245 | 2440 | 2490 | 505 |
| 90 | 40 | 0 | 1590 | 3510 | 4050 | 595 |
| 90 | 40 | 39 | 1463 | 2620 | 2620 | 500 |

From the data set forth in Table III it is apparent that the reaction product of 2,4 tetrahydroxy diphenyl methane and beta naphthyl amine is an excellent anti-oxidant and exhibits to a highly satisfactory degree the age resisting qualities of the preferred new class of compounds.

As another example of the use of the preferred class of compounds, substantially one molecular proportion of 2,3 tetrahydroxy diphenyl methane, prepared by reacting substantially two molecular proportions of pyrocatechol with substantially one molecular proportion of formaldehyde, was reacted with substantially four molecular proportions of alpha naphthyl amine in a manner analogous to that by which the reaction product of 2,4 tetrahydroxy diphenyl methane and beta naphthyl amine, as hereinbefore set forth, was prepared. The product was a solid which melted at substantially 98 to 101° C.

The reaction product prepared as described was compounded in a rubber stock comprising 100 parts of smoked sheet rubber
40 parts of carbon black
10 parts of zinc oxide
2 parts of a blended mineral oil and rosin
3.25 parts of sulfur
1 part of diphenyl guanidine
1 part of anti-oxidant The compounded rubber stock was then vulcanized in the well known manner and the cured rubber aged in the oxygen bomb for 39 hours at 70° C. and under an oxygen pressure of 300 pounds per square inch. The results of the tests on the aged and unaged vulcanized rubber products are given in Table IV.

*Table IV*

| Cure | | Hours aged | Modulus of elasticity in lbs./in.$^2$ at elongations of— | | Tensile at break in lbs./in.$^2$ | Ultimate elongation percent |
|---|---|---|---|---|---|---|
| Time mins. | Lbs. steam pressure | | 300% | 500% | | |
| 30 | 40 | 0 | 846 | 2210 | 2805 | 580 |
| 30 | 40 | 39 | 701 | 1555 | 1555 | 500 |
| 60 | 40 | 0 | 1295 | 3275 | 4585 | 655 |
| 60 | 40 | 39 | 1115 | 2200 | 2320 | 515 |
| 90 | 40 | 0 | 1695 | 3650 | 4265 | 565 |
| 90 | 40 | 39 | 1425 | -------- | 1830 | 415 |

As a further example of the use of the preferred class of anti-oxidants, 2,4 tetrahydroxy diphenyl methane prepared in the manner hereinbefore set forth and ortho toluidine in the ratio of substantially one molecular proportion of the former to an excess over substantially four molecular proportions of the latter were heated in the presence of a small proportion of a condensing agent or catalyst for example iodine for approximately from three to five hours at a temperature of substantially 180 to 200° C. After the reaction was completed the unreacted excess of ortho toluidine was removed by any convenient means, as for example by steam distillation. The residual product was washed first with a dilute aqueous alkali solution, as for example a five percent aqueous sodium hydroxide solution, and then with water. The product prepared in the manner described is a dark colored resin which was incorporated in a rubber stock comprising 100 parts of smoked sheet rubber
40 parts of carbon black
10 parts of zinc oxide
2 parts of a blended mineral oil and rosin
3.25 parts of sulfur
1 part of diphenyl guanidine
1 part of anti-oxidant The compounded rubber stock was vulcanized and portions of the cured rubber product aged in the oxygen bomb in the manner hereinbefore set forth for 39 hours at 70° C. and under an oxygen pressure of 300 pounds per square inch. The results of the tests of the aged and unaged vulcanized rubber product showed this material to possess anti-oxidant properties typical of the preferred class of compounds.

In all of the examples hereinbefore cited, diphenyl guanidine was employed as an accelerator, because it is known to produce a vulcanized rubber stock that imparts exceptionally poor aging qualities to a cured rubber stock and consequently does not mask the effect of the anti-oxidant. Other accelerators could, of course, be employed and would produce a stock possessing different tensile strengths from those in the examples set forth. Such stocks, however, still possessed desirable aging characteristics when the preferred class of materials were employed therein.

Other hydroxy diphenyl alkylidene compounds than those hereinbefore set forth may be reacted with aromatic amines and employed as anti-oxidants. Thus, dihydroxy diphenyl ethane, dihydroxy diphenyl propane, 2,4 tetrahydroxy diphenyl ethane, 2,4 tetrahydroxy diphenyl propane and the like may be reacted with aniline, alpha and beta naphthyl amine and analogous compounds and employed as anti-oxidants in a rubber composition of vulcanization characteristics. Other types of rubber compounds readily apparent to those skilled in the art can likewise be employed in place of the tread formula set forth in the examples of the process.

What is claimed is:

1. The process of producing an age resisting vulcanized rubber product which comprises heating rubber and sulfur in the presence of an anti-oxidant selected from a group consisting in the reaction product of one molecular proportion of dihydroxy diphenyl methane heat treated at substantially 220° C. and two molecular proportions of an amine selected from beta naphthyl amine, alpha naphthyl amine, and aniline, reaction product of one molecular proportion of 2,4 tetrahydroxy diphenyl methane and four molecular proportions of beta naphthyl amine, reaction product of substantially one molecular proportion of 2,3 tetrahydroxy diphenyl methane and four molecular proportions of alpha naphthyl amine and the reaction product of one molecular proportion of 2,4 tetrahydroxy diphenyl methane and four molecular proportions of ortho toluidine.

2. The age resisting vulcanized rubber product prepared by heating rubber and sulfur in the presence of an anti-oxidant selected from a group consisting in the reaction product of one molecular proportion of dihydroxy diphenyl methane and two molecular proportions of an amine selected from beta naphthyl amine, alpha naphthyl amine, and aniline, reaction product of one molecular proportion of 2,4 tetrahydroxy diphenyl methane and four molecular proportions of beta naphthyl amine, reaction product of substantially one molecular proportion of 2,3 tetrahydroxy diphenyl methane and four molecular proportions of alpha naphthyl amine and the reaction product of one molecular proportion of 2,4 tetrahydroxy diphenyl methane and four molecular proportions of ortho toluidine.

3. A composition of matter comprising rubber and a condensation product of two molecular proportions of phenol and one molecular proportion of formaldehyde produced in the presence of an acid catalyst heated at a temperature of substantially 220° C., said heat treated condensation product being further reacted with substantially two molecular proportions of an amine selected from the group consisting in beta naphthyl amine, alpha naphthyl amine and aniline.

4. A process of producing an age resisting vulcanized rubber product which comprises heating rubber and sulfur in the presence of an antioxidant comprising a reaction product of dihydroxy diphenyl methane heat treated at substantially 220° C. and an aromatic primary amine in sufficient quantity to react in equi-molecular quantities with said hydroxy groups.

5. A process of producing an age resisting vulcanized rubber product which comprises heating rubber and sulfur in the presence of an antioxidant comprising a reaction product of dihydroxy diphenyl methane heat treated at substantially 220° C. and substantially two molecular proportions of beta naphthyl amine.

6. The age resisting vulcanized rubber product prepared by heating rubber and sulfur in the presence of an antioxidant comprising a reaction product of dihydroxy diphenyl methane heat treated at substantially 220° C. and an aromatic primary amine in sufficient quantity to react in equi-molecular quantities with said hydroxy groups.

7. The age resisting vulcanized rubber product prepared by heating rubber and sulfur in the presence of an antioxidant comprising a reaction product of dihydroxy diphenyl methane heat treated at substantially 220° C. and substantially two molecular proportions of beta naphthyl amine.

8. The process of producing an age resisting vulcanized rubber product which comprises heating rubber and sulfur in the presence of an antioxidant comprising a reaction product of a dihydroxy diphenyl alkylidene compound heat treated at substantially 220° C. and an aromatic primary amine in sufficient quantity to react in equi-molecular quantities with said hydroxy groups.

9. The age resisting vulcanized rubber product prepared by heating rubber and sulfur in the presence of an antioxidant comprising a reaction product of a dihydroxy diphenyl alkylidene compound heat treated at substantially 220° C. and an aromatic primary amine in sufficient quantity to react in equi-molecular quantities with said hydroxy groups.

ROBERT L. SIBLEY.